United States Patent [19]

Nagumo et al.

[11] Patent Number: 4,560,104
[45] Date of Patent: Dec. 24, 1985

[54] COOLANT TEMPERATURE CONTROL SYSTEM OF INTERNAL COMBUSTION ENGINE

[75] Inventors: Shinichi Nagumo; Yoshifumi Hase, both of Yokohama; Fumio Sanezawa, Yokosuka, all of Japan

[73] Assignee: Nissan Motor Co., Ltd., Yokohama, Japan

[21] Appl. No.: 557,884

[22] Filed: Dec. 5, 1983

[30] Foreign Application Priority Data

Dec. 6, 1982 [JP] Japan .................................. 57-213599
Mar. 3, 1983 [JP] Japan ............................. 58-30794[U]

[51] Int. Cl.[4] .............................................. F01P 7/02
[52] U.S. Cl. .................... 236/34.5; 236/92 R
[58] Field of Search ...... 236/34, 34.5, 92 R; 137/508; 123/41.13, 41.05

[56] References Cited

U.S. PATENT DOCUMENTS

| 2,622,572 | 12/1952 | Nallinger | 123/41.13 X |
| 2,833,478 | 5/1958 | Middleton | 236/34.5 X |
| 3,276,470 | 10/1966 | Griffing | 137/508 X |
| 3,313,483 | 4/1967 | Nallinger | 236/34.5 |
| 3,410,090 | 11/1968 | Thirion | 137/508 X |
| 3,994,269 | 11/1976 | Takaoka et al. | 236/92 R X |
| 4,344,564 | 8/1982 | Magnuson | 236/34.5 |
| 4,393,819 | 7/1983 | Tanaka et al. | 236/34.5 X |

FOREIGN PATENT DOCUMENTS 54-142722 10/1979 Japan .

Primary Examiner—William E. Tapolcai
Attorney, Agent, or Firm—Schwartz, Jeffery, Schwaab, Mack, Blumenthal & Evans

[57] ABSTRACT

A coolant temperature control system of an internal combustion engine is composed of a thermostat disposed in a coolant passageway leading to a radiator. The thermostat is operatively connected to a diaphragm actuator so that valve opening temperature of a thermostat valve is controlled in response to engine loads. Additionally, the thermostat valve is arranged to be opened in response to the discharge pressure of a coolant pump, thereby lowering the opening temperature of the thermostat valve at a high speed engine operating range.

20 Claims, 12 Drawing Figures

COOLANT TEMPERATURE CONTROL SYSTEM OF INTERNAL COMBUSTION ENGINE

BACKGROUND OF THE INVENTION

1. Field of the Invention

This invention relates to an improvement in a coolant temperature control system of an internal combustion engine for the purpose of controlling coolant temperature at suitable levels even at a high load engine operating range.

2. Description of the Prior Art

Most internal combustion engines of automotive vehicles and the like are provided with an engine cooling system using an engine coolant which is circulated through a coolant jacket formed in an engine body, in which the temperature of the coolant is controlled in response to engine load conditions so as to be at relatively high levels during a low load engine operating range and to be at relatively low levels during a high load engine operation in order to achieve improvements in fuel economy, exhaust emission (particularly hydrocarbons emission reduction), and power output.

Such coolant temperature control has been carried out, for example, under the action of a coolant temperature control system which includes a thermostat disposed in a coolant passageway leading to a radiator. The thermostat is operatively connected to a diaphragm actuator which controls the valve opening temperature of the thermostat in response to engine load condition.

However, the thermostat of such an coolant temperature control system is so arranged that the discharge pressure of a coolant pump acts in a direction to close a valve member of the thermostat. Consequently, the valve opening temperature of the thermostat is unavoidably shifted to a higher temperature side as engine speed increases to raise the revolution speed of a coolant pump. As a result, the coolant temperature control is carried out within higher levels at a high speed engine operating range even in case where engine load is constant. This deteriorates the durability the engine and shortens the life of the same.

SUMMARY OF THE INVENTION

A coolant temperature control system of an internal combustion engine according to the present invention comprises a thermostat disposed in a coolant passageway leading to a radiator. The thermostat includes a thermally responsive member which is movable in response to the temperature of an engine coolant flowing through the coolant passageway. A valve is associated with the thermally responsive member and movable in accordance with the movement of the thermally responsive member. The valve is closable to block the coolant passageway so as to prevent the flow of the coolant to the radiator. A control device is provided to control the valve opening temperature of the thermostat higher at a low load engine operating range than at a high load engine operating range. Additionally, a driving device is provided to drive the thermostat valve in the direction to open in response to the discharge pressure of a coolant pump disposed in the coolant passageway.

Consequently, the coolant pump discharge pressure acts on the thermostat valve so as to lower the valve opening temperature of the thermostat, thereby suppressing unnecessary and excessive rise in the coolant temperature at a high speed engine operating range. This improves the durability of the engine and prolongs the life of the same, while improving fuel economy and exhaust emission at a medium and low speed engine operating range.

BRIEF DESCRIPTION OF THE DRAWINGS

The features and advantages of the coolant temperature control system according to the present invention will be more clearly appreciated from the following description taken in conjunction with the accompanying drawings in which like reference numerals designate corresponding parts and elements throughout all the drawings, in which.

DETAILED DESCRIPTION OF THE INVENTION

Figure 1:
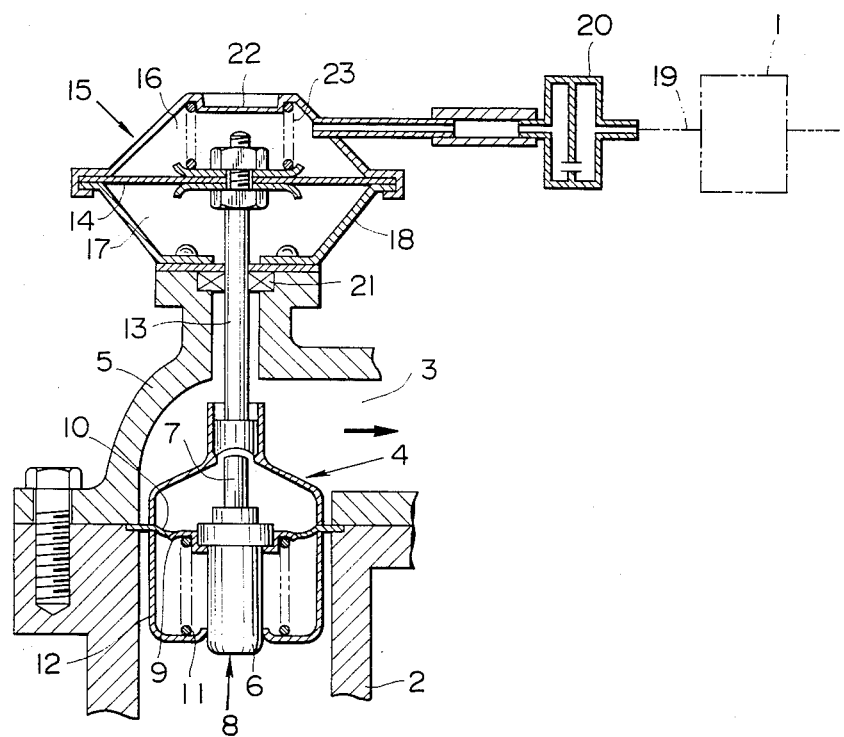
FIG. 1 is a vertical sectional view of a conventional coolant temperature control system of an automotive internal combustion engine.

To facilitate understanding the present invention, a brief reference will be made to a conventional coolant temperature control system, depicted in FIGS. 1 to 4. Referring to FIG. 1, the conventional coolant temperature control system incorporates with an engine cooling system in which engine coolant or cooling water is circulated under pressure through a coolant or water jacket (not shown) in an engine 1 under the action of coolant pump or water pump, thereby absorbing heat generated in the engine 1. The coolant whose temperature has been thus raised is fed from an coolant or water outlet 2 (formed in the engine side) through a coolant or water passageway 3 to a radiator (not shown) so as to release the heat to the air; and the coolant whose temperature is thus lowered is again led to the coolant jacket in the engine 1.

The conventional coolant temperature control system has a thermostat 4 disposed in the coolant passageway 3 to control the amount of the coolant flowing into the radiator in accordance with the temperature of the coolant. The thermostat 4 is provided with a flange (no numeral) which is located at the connecting section of the water outlet 2 and a coolant or water outlet housing 5 in a manner to be put therebetween. The thermostat flange is fixed in position by means of bolts which serve to fix the coolant outlet housing 5 to the engine side coolant outlet 2.

The thermostat 4 is of a so-called wax type wherein solid wax and a resilient member (rubber) are disposed within a wax casing 6. Additionally, a piston rod 7 is connected to the resilient member and projected out of the wax casing 10. Accordingly, as the coolant temperature rises, the wax makes a change from solid phase to liquid phase accompanying its volume change or expansion, so that the piston rod 7 is pushed up through the resilient member. It will be understood that a thermally responsive member 8 of the thermostat 4 includes the wax casing 6 containing therein the wax and the resilient member, and the piston rod 7.

A valve member 9 is located around and secured to the outer peripheral surface of the wax casing 6 so as to act as a single member. The valve member 9 is seated on a valve seat 10 upon being upwardly biased by a spring 11 disposed within a spring seat 12, thus closing the thermostat 4. As the coolant temperature rises, the piston rod 7 is pushed up and brought into contact with a control rod member 13 which will be discussed hereinafter, and thereafter the wax casing 6 is pushed down in the drawing. As a result, the valve member 9 integrally connected to the wax casing 6 separates from the valve seat 10, thus opening the thermostat 4. The control rod member 13 is disposed in opposition to the thermally responsive member 8 in order to restrict the upward movement and determine the uppermost position of the piston rod 7. Additionally, the control rod member 13 is fixedly connected at its one end with a diaphragm 14 of a diaphragm actuator 15 in order to change the uppermost position of the piston rod 7 in accordance with engine load.

The diaphragm 14 divides the interior of the diaphragm device 15 into a vacuum chamber 16 and an atmospheric chamber 17 which communicates through openings 18 with atmospheric air. The vacuum chamber 16 communicates through a vacuum passage 19 with the air intake system of the engine 1 so that intake vacuum of the engine 1 is introduced to the vacuum chamber 16. A vacuum throttling valve 20 is disposed in the vacuum passage 19. The reference numeral 21 denotes a sealing member for preventing leakage of the coolant, 22 a stopper for restricting the upward movement and determining the uppermost position of the control rod member 13, and 23 a diaphragm spring for biasing downward the diaphragm 14 in the drawing.

Figure 2:
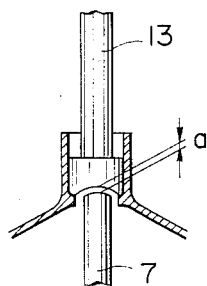
FIGS. 2 and 3 are enlarged sectional views of an essential part of the system of FIG. 1, illustrating the operation thereof.

In operation, during a high load engine operation, the intake vacuum introduced to the vacuum chamber 16 is close to the atmospheric pressure and therefore the diaphragm 14 is positioned as shown in FIG. 1. At this time, a clearance a is formed between the control rod member 13 and the piston rod 7 as shown in FIG. 2. In this state, when the coolant temperature rises, the wax within the wax casing 6 expands to push up the piston 7. Upon the upward movement by a distance a, the piston rod 7 is brought into contact with the control rod member 13 and accordingly cannot move upwardly over this position. Then, the wax casing 6 is pushed down against the bias of the spring 11 under the reaction of the force by which the piston rod 7 pushes up the control rod member 13, so that the valve member 9 secured to the wax casing 6 separates from the valve seat 10, thereby opening the thermostat 4.

It will be understood that the clearance a is set in dependence on engine characteristics, in which the clearance a is, for example, so set that the piston rod 7 is brought into contact with the control rod member 13 when the coolant temperature becomes 70° C. during a high load engine operation in order to open the thermostat 4 at 70° C.

Figure 3:
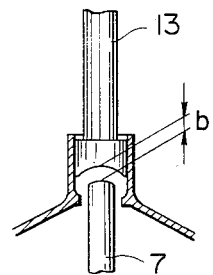

In contrast with the above, during a low load engine operation, the intake vacuum increases and therefore the diaphragm 14 moves upward against the bias of the spring 23, so that the control rod member 13 integrally connected with the diaphragm 14 is raised to a position as shown in FIG. 3 in which a clearance "b" (b>a) is formed between the control rod member 13 and the piston rod 7. Consequently, in order that the piston rod 7 be brought into contact with the control rod member 13 to open the thermostat 4, the piston rod 7 must be further raised as compared with during the high load engine operation. Accordingly, the opening temperature of the thermostat 4 during the low load engine operation is higher than that during the high load engine operation because of the fact that the raised amount of the piston rod 7 is proportional to coolant temperature. It will be understood that this clearance b is, for example, so set that the piston rod 7 is brought into contact with the drive shaft 13 when the coolant temperature reaches 95° C. during the low load engine operation in order to open the thermostat 4 at 95° C.

Figure 4:
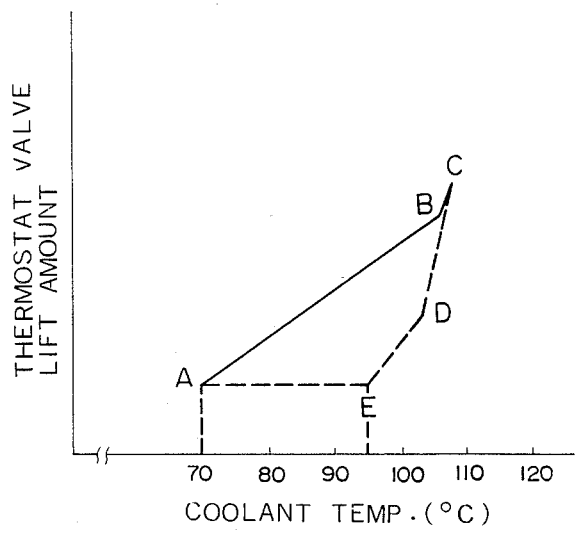
FIG. 4 is a graph showing the lift characteristics of a thermostat valve of the system of FIG. 1.

Such lifting characteristics of the thermostat 4 is depicted in FIG. 4 in which a solid line indicates the lifting characteristics during the high load engine operation while a broken line indicates that during the low load engine operation. The piston rod 7 is brought into contact with the control rod member 13 at points A and E, respectively, during the high and low load engine operations. In addition, the spring 23 is put into a completely contracted state at points B and D. The valve member 9 moves only under the force of expansion of the wax in the wax casing 6 from a point B to a point C and from a point C to a point D. Thus, the coolant temperature is variably controlled in accordance with engine load conditions.

Now, the discharge pressure of the coolant pump acts in the direction to close the valve member 9, and consequently as engine speed increases, the revolution speed of the coolant increases to raise the pump discharge pressure, thus decreasing the valve opening degree of the thermostat in its open state. This leads to the fact the coolant flow amount to the radiator decreases with a raised engine speed even if the load is the same, and therefore the coolant temperature is unavoidably set at a higher value than required.

In this connection, the inventor's experiments have revealed that the improving effect of raised coolant temperature on fuel economy and exhaust emission is obtained at a low engine speed operating range whereas such an effect can scarcely be obtained at a high engine speed operating range. In addition, it will be appreciated that a higher coolant temperature degrades the durability of the engine. In other words, with the conventional engine coolant temperature control system as shown in FIG. 1, the temperature of the engine coolant is controlled to be raised at the high engine speed operating range even though there is no improvement effect of fuel economy and exhaust emission at the high engine speed operating range, thereby shortening the life of the engine.

Figure 5:
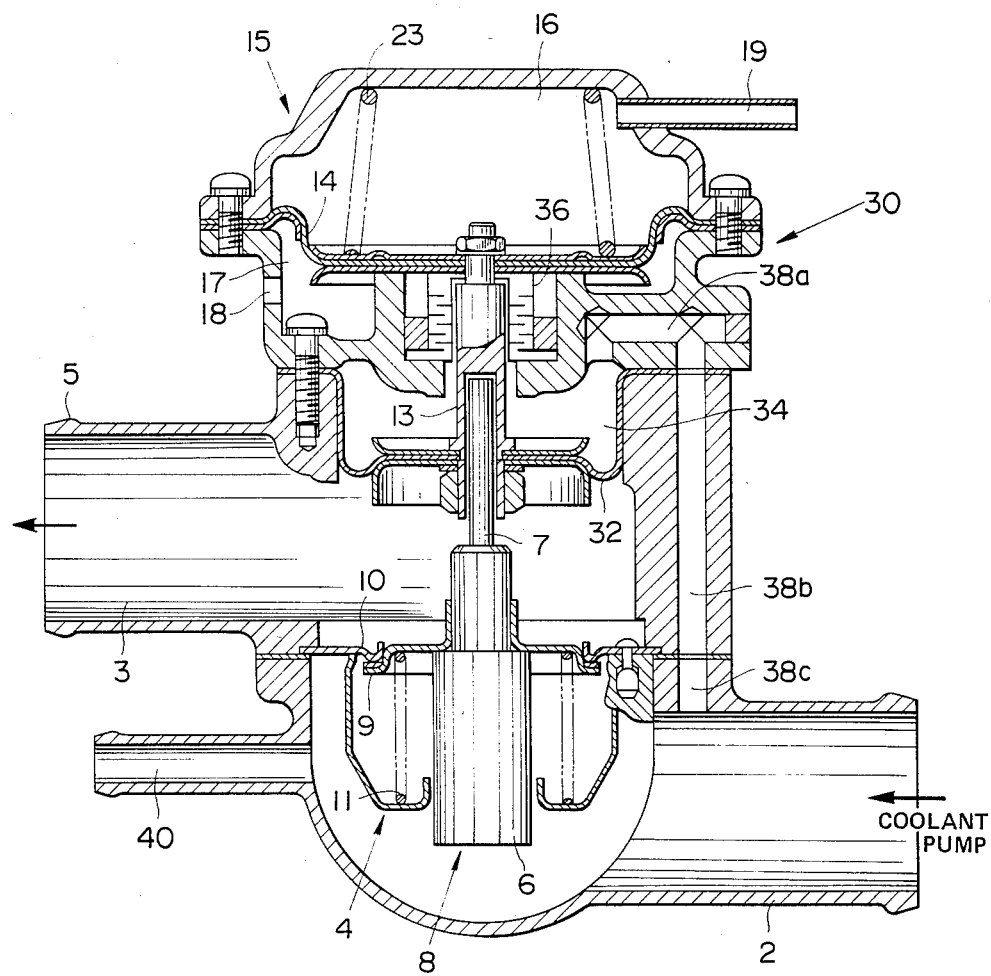
FIG. 5 is a vertical sectional view of a first embodiment of a coolant temperature control system in accordance with the present invention.

In view of the above description of the conventional engine coolant temperature control system, reference is now made to FIGS. 5 to 9 which are directed to a variety of embodiments of the present invention in which the same reference numerals as in FIG. 1 designate the corresponding parts and elements for the purpose of simplicity of illustration. Referring specifically to FIG. 5, a first embodiment of a coolant temperature control system is illustrated by the reference numeral 30. The coolant temperature control system 30 shown in FIG. 5 is used in cooperation with a cooling system (not shown) of an automotive internal combustion engine (not shown), and is composed of a thermostat 4 which is disposed in a coolant passageway or radiator inlet passageway 3. The coolant passageway 3 is formed by a coolant outlet 2 of the engine side and a coolant outlet housing 5 secured to the coolant outlet 2. The thermostat 4 has a thermally responsive member 8 which includes a piston rod 7 which is movable upward and downward. Additionally, a diaphragm actuator 15 is provided with a control rod member 13 which is movable in response to engine load condition under the action of a diaphragm 14.

In this embodiment, another diaphragm 32 is secured to the control rod member 13 and defines a coolant pressure chamber 34. The coolant pressure chamber 34 is located under an atmospheric chamber 17 of the diaphragm actuator 15 and separated therefrom by a bellows (diaphragm) 36 disposed at the upper end section of the control rod member 13. The bellows 36 is smaller in diameter than the diaphragm 32. The coolant pressure chamber 34 is communicated with the coolant passageway 3 upstream of the thermostat 4 and downstream of the coolant pump through a pressure passages 38A, 38B and 38C which is formed in the walls of the coolant outlet housing 5, the coolant outlet 2 and the like. Accordingly, the coolant pressure chamber 34 is supplied with the discharge pressure of a coolant or water pump (not shown) which pressure is supplied into the coolant passage 3, so that the diaphragm 32 is movable in response to the coolant pump discharge pressure so as to drive the thermostat 4 in a manner that a valve member 9 moves in the direction to open. The reference numeral 40 denotes a bypass passage which branches off from the coolant outlet 2 and bypasses a radiator (not shown) to be communicated with the suction side of the coolant pump.

With the thus-arranged coolant temperature control system 30 shown in FIG. 5, at a low engine speed operating range in which the discharge pressure of the coolant pump is not so high, the pressure within the coolant pressure chamber 34 supplied with the pump discharge pressure is lower and therefore the control rod member 13 is movable in response to engine intake vacuum or engine load under the action of the diaphragm actuator 15, thereby achieving a higher side temperature control during a low load engine operation in which intake vacuum is higher while a lower side coolant temperature control during a high engine load operation in which intake vacuum is lower.

When engine operation is shifted into a high engine speed range accompanying a raised discharge pressure of the coolant pressure, the pressure within the coolant pressure chamber 34 rises to act on the diaphragm 32, so that the control rod member 13 is strongly urged downwardly in the drawing. It will be understood that the valve opening temperature at which the thermostat 4 opens can be lowered when engine speed becomes higher even during the low engine operation, by setting the pressure receiving surface area of the diaphragms 14 and 32 etc. so as to cause the control rod member 13 to move downward in the drawing overcoming the bias of the vacuum within the vacuum chamber 16 of the diaphragm actuator 15 when the discharge pressure of the coolant pump supplied to the coolant pressure chamber 34 exceeds a predetermined level when though a higher vacuum is supplied to the vacuum chamber 16 during the low load engine operation.

Thus, according to the present invention, the valve opening temperature of the thermostat 4 can be lowered at the high speed engine operating range even during the low load engine operation, thereby enabling coolant temperature control at a lower temperature side. As a result, the coolant temperature is maintained at a low level as compared with in the conventional coolant temperature control system as shown in FIG. 1, thus preventing degradation of engine durability due to higher coolant temperatures at the high speed engine operating range while effectively achieving the improvements in fuel economy and exhaust emission at a low and medium speed engine operating range.

Figure 6:
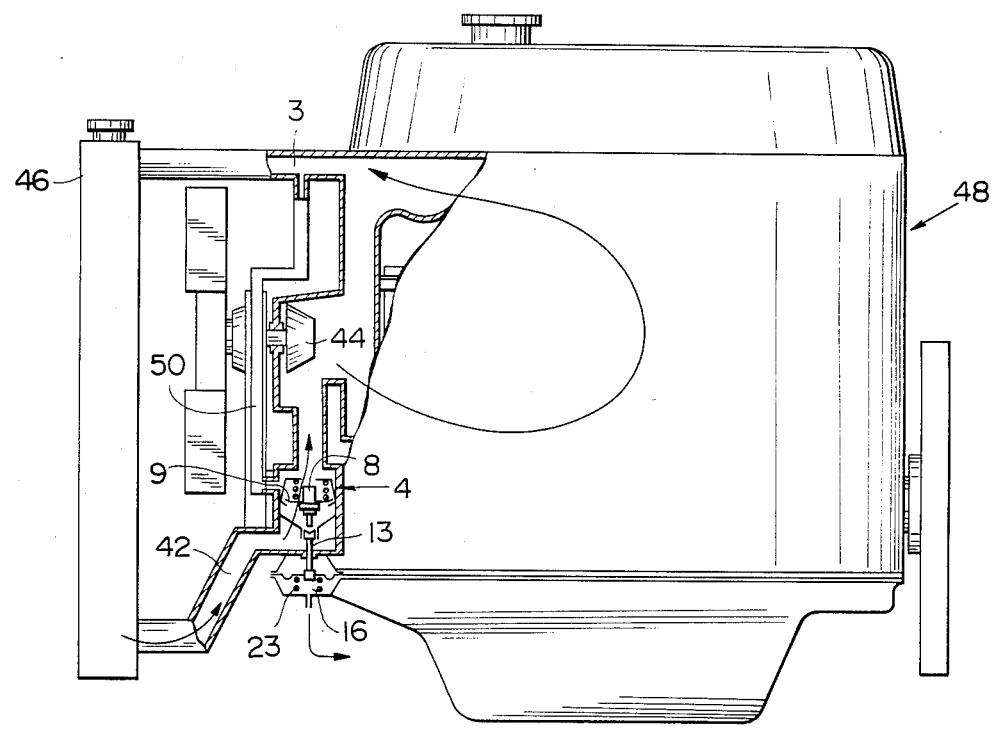
FIG. 6 is a side elevation, partly in section, of an internal combustion engine equipped with a second embodiment of the coolant temperature control system according to the present invention.

FIG. 6 illustrates a second embodiment of the coolant temperature control system according to the present invention, in which the thermostat 4 and the control rod member 13 are located in a coolant passageway or radiator outlet passageway 42 which is located upstream of a coolant pump 44 and leads to the radiator inlet passageway 3. Additionally, the valve member 9 of the thermostat 4 is so arranged that the discharge pressure of the coolant pump acts in the direction to open the valve member 9 or move the valve member 9 upwardly in the drawing. Strictly speaking, the above-mentioned discharge pressure of the coolant pump is a pressure which is obtained by subtracting a flow resistance (from the discharging section of the coolant pump 44 through the radiator 46 to the valve member 9) from the pressure differential between the discharge side and the suction side of the coolant pump 44. In this embodiment, in order that the thermally responsive member 8 can correctly sense the temperature of the coolant circulating an engine body 48 even when the thermostat 4 is closed, a bypass passage 50 is disposed to connect the radiator inlet passage 3 and the radiator outlet passage 42 in the vicinity of the thermally responsive member 8.

With this arrangement, even during the low load engine operation in which the vacuum supplied to the diaphragm device vacuum chamber 16 becomes higher so as to move the control rod member 13 downward in the drawing or to a higher temperature side, the coolant pump discharge pressure which rises with an increased engine speed acts on the valve member 9 of the thermostat 4, thus increasing the opening degree of the valve member 9 during an engine operation in which the diaphragm spring cannot completely contact under the action of only the vacuum supplied to the vacuum chamber 16 of the diaphragm device 15. Thus, the coolant temperature can be controlled at the lower temperature side.

Figure 7:
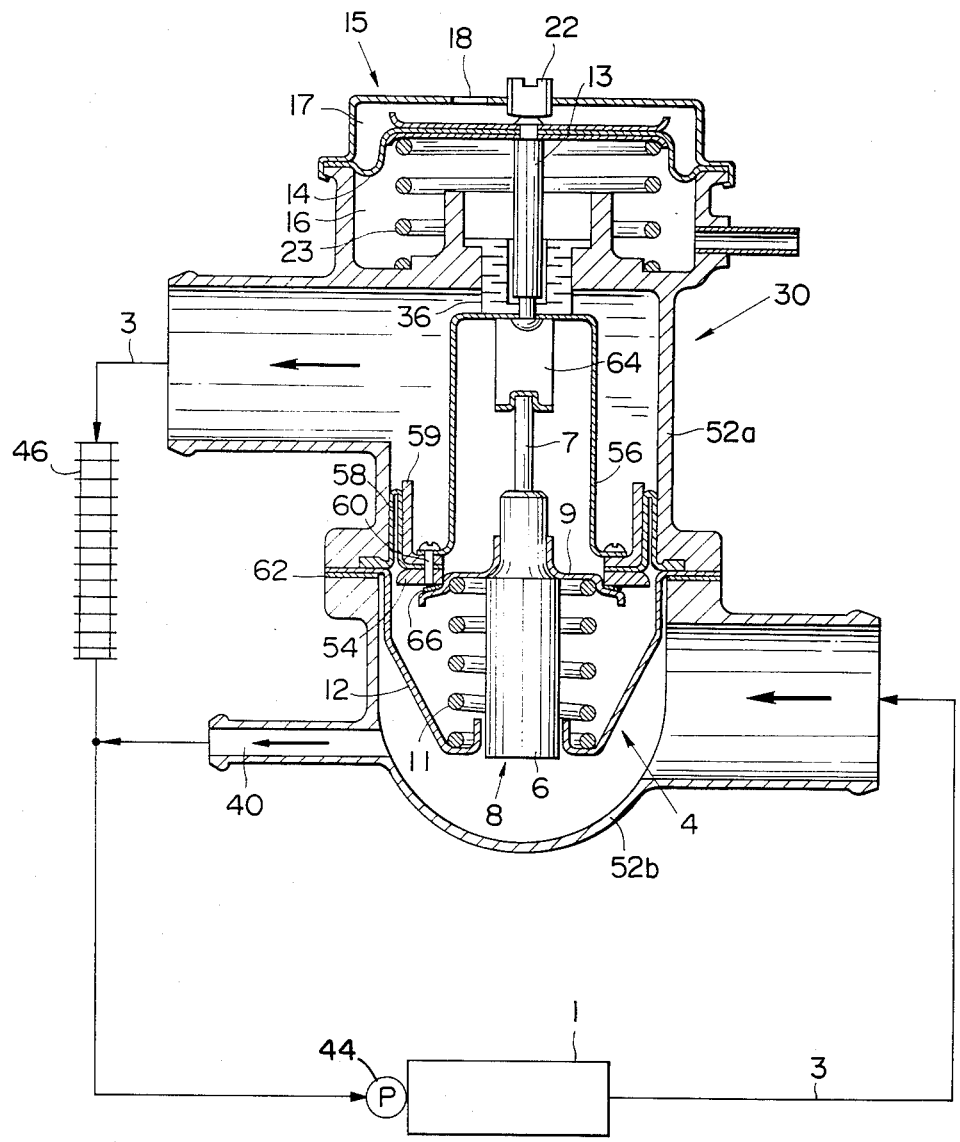
FIG. 7 is a vertical sectional view of a third embodiment of the coolant temperature control system according to the present invention.

FIG. 7 illustrates a third embodiment of the coolant temperature control system according to the present invention. In this embodiment, the thermostat 4 is disposed in the coolant passageway 3 connecting the coolant outlet of the engine 1 and the radiator 46. The thermostat 4 is disposed in a housing constructed of upper and lower parts 52a and 52b. The diaphragm actuator 15 is formed integrally with the housing upper part 52a and so arranged that the diaphragm 14 moves downward in response to an increased intake vacuum in the engine 1.

As shown, a movable valve seat 54 is connected through a stay 56 with the control rod member 13 of the diaphragm actuator 15 so as to be movable in the same direction as the valve member 9 or in the upward and downward direction in the drawing. A bellows (diaphragm) 58 is disposed between the movable valve seat 54 and the housing 52a, 52b in a manner to be responsive to the discharge pressure of the coolant pump 44. Specifically, the inner peripheral portion of the bellows 58 is securely put between the movable valve seat 54 and a bellows guide 59 and fixed with the stay 56 by means of bolts 60, while the outer peripheral portion of the bellows 58 is fixedly put between the upper and lower parts 52a, 52b of the housing at the connecting section thereof, together with a sealing member 62.

A piston rod seat 64 is secured to the housing upper part 52a. In this embodiment, the piston rod 7 is secured to the piston rod seat 64 in its extended state, in which a space is formed between the piston rod member 7 and the wax in a lower coolant temperature condition. Accordingly, when the coolant temperature rises so that the wax fills this space, a force is transmitted to the piston rod member 7 to open the thermostat 4. The piston rod 7 may not be secured to the piston rod seat 64 so as to be separable from the piston rod seat, in which the piston rod is brought into contact with the piston rod seat upon extending upwardly. The valve member 9 is provided with a resilient member for maintaining a fluid-tight connection with the valve seat 54.

The operation of the coolant temperature control system of FIG. 7 will be discussed with reference to FIGS. 8A to 8D.

In the maximum load engine operating condition, the control rod member 13 is brought into contact with a stopper 22 and therefore cannot move upwardly over this position. However, during a high load engine operation in which the engine load has not reached the maximum value, the diaphragm 14 slightly moves downward against the bias of the spring 23 under the action of vacuum created in accordance with the opening degree of a throttle valve (not shown) of the engine, so that a clearance is formed between the control rod member 13 and the stopper 22. At this time, the movable valve seat 54 which moves with the diaphragm 16 as a single member is in the state shown in FIG. 8A.

When the temperature of the coolant is relatively low, the valve member 9 fixed to the wax casing 6 is seated on the movable valve seat 54 under the bias of the spring 11. When the coolant temperature rises, the wax in the wax casing 6 expands to fill the space between the wax and the piston rod 7, so that the piston rod 7 seems to be pushed up upwardly in the drawing. However, since the piston rod 7 is fixed to the piston rod seat 64, the wax casing 6 is pushed down in the drawing thereby to separate the valve member 9 from the movable valve seat 54. As a result, the coolant which has been prevented from flowing to the radiator 46 starts to flow through the coolant passageway 3 into the radiator 46.

Figure 8A:
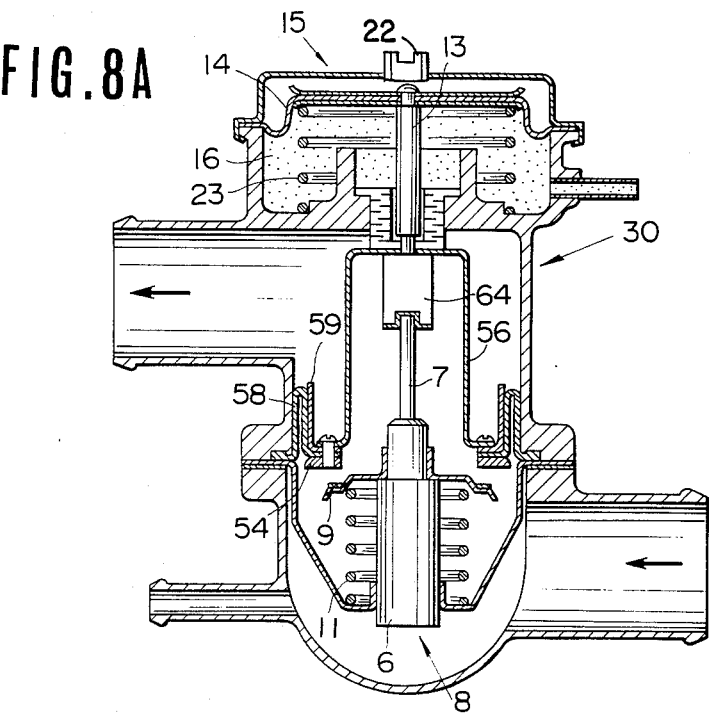
FIGS. 8A to 8D are schematic illustrations showing the operation of the system of FIG. 7.
Figure 8B:
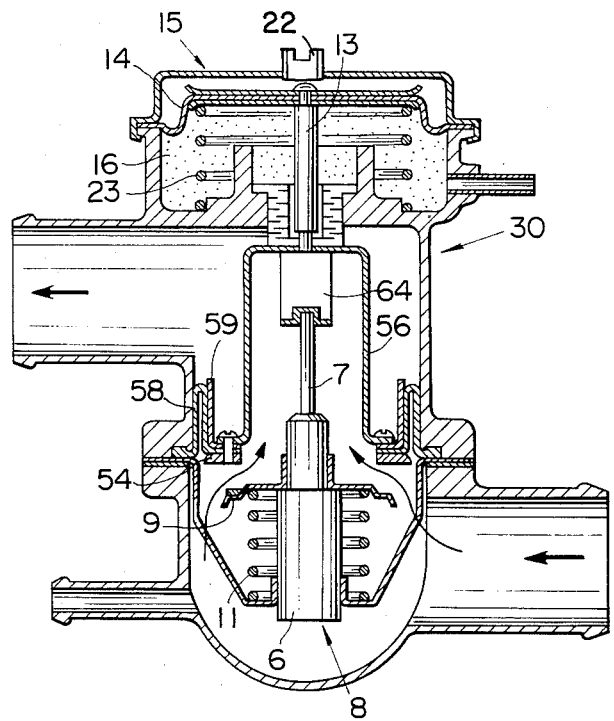

At a low speed engine operating range, the discharge pressure of the coolant pump is not so high. However, the coolant pump discharge pressure becomes high when engine operation shifts to a high engine speed range, and the thus-raised pump discharge pressure acts on the bellows 58 thereby to push up the movable valve seat 54. At this time, since the valve member 9 is kept in the same position, the valve opening degree of the thermostat 4 increases, thus increasing the flow amount of the coolant flowing to the radiator 46 as shown in FIG. 8B.

Figure 8C:
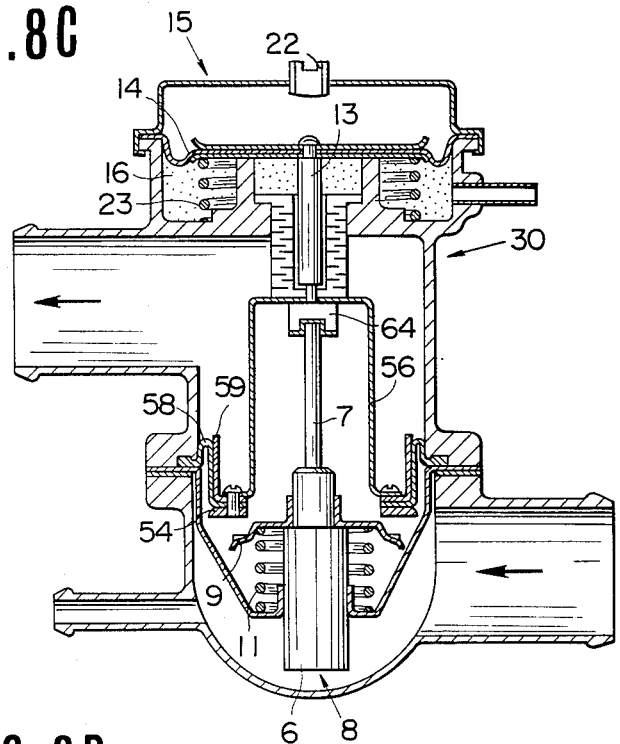

During a low load engine operation in which engine intake vacuum increases, the diaphragm 14 is moved downward against the bias of the spring 23 or against the bias of the two springs 23 and 11 during the closing of the thermostat 4, and consequently the movable valve seat 54 is also moved downwardly thereby to take the state shown in FIG. 8C.

Even in this state, the thermostat 4 is closed when the coolant temperature is relatively low. The position of the valve member 9 in its closed state is lowered by an amount corresponding to a distance of the downward movement of the movable valve seat 54, so that the bias of the spring 11 corresponding to the thus-lowered position of the movable valve seat 54 additionally acts on the valve member 9. In this connection, the space between the wax and the piston rod 7 in the wax casing 6 also increases by an amount corresponding to the lowered position of the movable valve seat 54. Accordingly, in order to open the thermostat 4 upon rising of the coolant temperature, a further temperature rise is required to fill the increased space with the wax, and additionally it is required to overcome the increased amount of the biasing force of the spring 11. It will be understood that these raise the opening temperature of the thermostate 4.

Figure 8D:
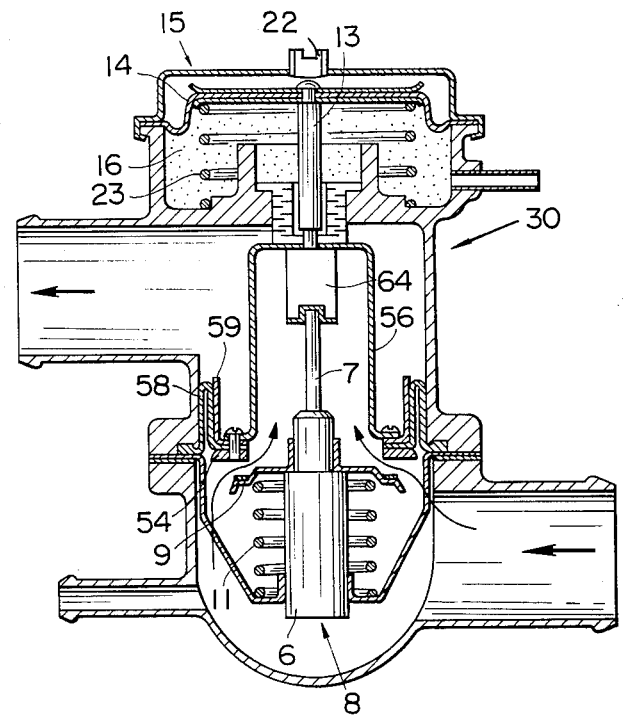

When engine operation shifts from the low engine speed range to the high engine speed range, the discharge pressure of the coolant pump acts on the bellows 58 so as to push up the movable valve seat 54. At this time, the valve member 9 is maintained at the same position, so that the valve opening degree of the thermostat 4 increases thereby to increase the flow amount of the coolant flowing into the radiator 46. As clearly shown, the position of the valve member 9 in FIG. 8D is different from that in FIG. 8C. That is, FIG. 8D shows the state in which the extending amount of the piston rod 7 decreases as a result of a sufficient cooling, so that the coolant temperature in FIG. 8D is lower than that in FIG. 8C. Accordingly, it will be appreciated that the valve opening degree of the thermostat 4 increases at the high speed engine operation by setting the pressure-receiving surface areas of the diaphragm 14 and the bellows 58 etc. so as to push up the movable valve seat 54 overcoming the bias of the vacuum within the vacuum chamber 16 when the pump discharge pressure acting on the bellows 58 increases, even during the engine operation in which the vacuum supplied to the vacuum pressure chamber 16 is considerably high. The thus-increased thermostat valve opening degree increases the flow amount of the coolant flowing to the radiator 46, thereby controlling the coolant temperature at lower levels.

Figure 9:
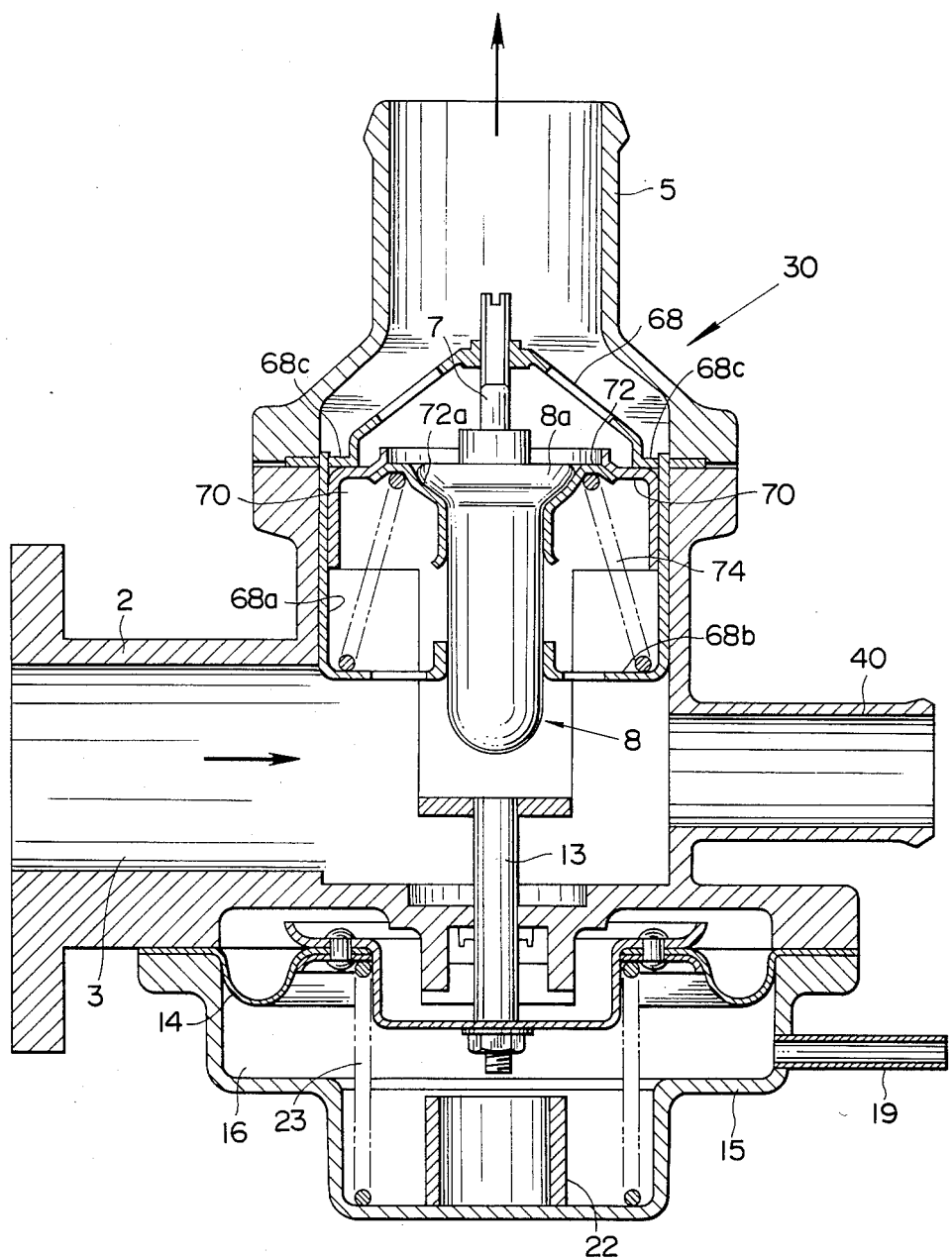
FIG. 9 is a vertical sectional view of a fourth embodiment of the coolant temperature control system in accordance with the present invention.

FIG. 9 illustrates a fourth embodiment of the coolant temperature control system in accordance with the present invention. In this embodiment, the thermostat 4 has a housing 68 disposed in the coolant passageway 3. A movable valve seat 70 is disposed in and slidable along the inner surface of the housing cylindrical section 68a. A thermostat valve member 72 fits around an upper large diameter section 8a of the wax casing 6 of the thermally responsive member 8 in a manner to be slidably movable axially and downward in the drawing. The valve member 72 is brought into contact with the movable valve seat 70 under the bias of a spring 74 disposed between the valve member 72 and the bottom section 68b of the thermostat housing 68. The control rod member 13 is integrally connected to the movable valve seat 70 so as to act as a single member, and at its one end secured to the diaphragm 14 of the diaphragm actuator 15. The diaphragm actuator 15 is provided with the stopper 22 for restricting the downward movement of the control rod member 13.

In a state where the coolant temperature control system 30 is not operating, i.e., in case where the engine is stalled and the coolant temperature is relatively low so that the wax in the wax casing 6 is not melted, the upper surface of the movable valve seat 70 is brought into contact with a engagement section 68c of the thermostat housing 68 under the bias of the spring 23 transmitted through the diaphragm 14 and the control rod member 13. Additionally, in this state, the valve member 72 is urged upwardly under the bias of the spring 74 to maintain the closing mode of the thermostat 4. Simultaneously, the piston rod 7 secured at its end section to the housing 68 and the thermally responsive member 8 are kept in the state shown in FIG. 9 in which the upper large diameter section 8a of the thermally responsive member 8 is in contact with the valve member 72.

In operation of the arrangement of FIG. 9, at a high load engine operating range, the engine intake vacuum supplied to the vacuum actuator vacuum chamber 16 is relatively low and close to the atmospheric pressure, and consequently the diaphragm 14 is scarcely moved toward the vacuum chamber 16 so as to be kept in the condition as shown in FIG. 9. Accordingly, the movable valve seat 70 is also kept in the condition in which its upper surface contacts with the engagement section 68c of the housing 68.

When the coolant temperature rises and the wax encapsulated in the wax casing 6 begins to melt, the thermally responsive member 8 is pushed down in the drawing since the piston rod 7 is secured to the housing 68. This motion of the thermally responsive member 8 causes the valve member 72 fitted around the wax casing 6 to move downwardly together with the thermally responsive member 8 against the bias of the spring 74, so that the valve member 72 separates from the valve seat 70 thereby to open the thermostat 4. The thus-opened thermostat 4 allows the coolant to flow to the radiator, thereby initiating the cooling of the engine coolant. It will be understood if it is sufficient that the spring 23 of the diaphragm actuator 15 has enough biasing force to keep the movable valve seat 70 in contact with the housing engagement section 68c, so that the biasing force of the spring 74 does not affect that of the spring 23 at the opening of the thermostat 4.

Subsequently, at a low load engine operating range, the engine intake vacuum is relatively high and therefore the diaphragm 14 is moved toward the vacuum chamber 16 against the bias of the spring 23, thereby moving downward the control rod 13. Accordingly, the movable valve seat 70 is moved downward along the inner peripheral surface of the thermostat housing cylindrical section 68a, so that the valve member 72 maintaining its closure mode upon contacting with the movable valve member 70 is pushed down, as it is, along the outer peripheral surface of the wax casing 6 of the thermally responsive member 8. In this state, the coolant in the coolant passageway 3 is not led to the radiator and therefore the coolant temperature rises.

At this time, the wax in the thermally responsive member 8 begins to melt and expand, and accordingly the thermally responsive member 8 begins to descend along the inner peripheral surface of the valve member 72 and then its upper larger diameter section 8a is brought into contact with the tapered section 72a of the valve member 72. Thereafter, the thermally responsive member 8 pushes down the valve member 72 against the bias of the spring 74 to allow the valve member 72 to separate from the movable valve seat 70, so that the coolant is led to the radiator. In other words, the valve opening temperature of the thermostat 4 during the low load engine operation becomes high as compared with that during the high load engine operation, thus enabling to maintain the coolant temperature at relatively low levels.

It will be understood that, also in the embodiment of FIG. 9, the discharge pressure of the coolant pump acts on the movable valve seat 70 and therefore the coolant temperature can be controlled at lower levels during a high speed engine operation.

As is appreciated from the above, according to the present invention, the coolant pump discharge pressure acts on the thermostat so as to lower the valve opening temperature of the thermostat. This suppresses an unnecessary and excessive rise in the coolant temperature in a high speed engine operating range, thereby improving the durability of the engine and prolonging the life of the engine. Of course, improvements in fuel economy and exhaust emission can be achieved at a medium and low speed engine operating range.

What is claimed is:

1. A coolant temperature control system of an internal combustion engine, comprising:
   a thermostat valve means disposed in a coolant passageway leading to a radiator and including a thermally responsive member which is movable in response to the temperature of a engine coolant flowing through the coolant passageway, a valve seat, and a movable valve member associated with said thermally responsive member and capable of operating in accordance with the movement of said thermally responsive member, said thermostat valve means being closable to block the coolant passageway so as to prevent the flow of said coolant to the radiator when said temperature of said engine coolant is below a thermostat valve opening temperature;
   means for increasing the value of said thermostat valve opening temperature when said engine operates in a low load engine operating range over the value of said thermostat valve opening temperature when said engine operates in a high load engine operating range; and
   pressure-responsive means connected to said valve seat or said valve member for driving said thermostat valve means in a direction to open in response to the discharge pressure of a coolant pump disposed in the coolant passageway.

2. A coolant temperature control system as claimed in claim 1, wherein said valve increasing means includes a diaphragm actuator having a first diaphragm which defines a vacuum chamber evacuated by the intake vacuum of the engine, and a control member connected to said diaphragm.

3. A coolant temperature control system as claimed in claim 2, wherein said thermally responsive member includes a piston rod extendable in response to the coolant temperature.

4. A coolant temperature control system as claimed in claim 3, wherein said valve member is secured to said thermally responsive member so as to move with said thermally responsive member as a single member.

5. A coolant temperature control system as claimed in claim 4, wherein said valve seat is stationary.

6. A coolant temperature control system as claimed in claim 5, wherein said driving means includes means for urging said thermally responsive member in a direction that said valve member separates from said valve seat in response to the coolant pump discharge pressure.

7. A coolant temperature control system as claimed in claim 6, wherein said urging means includes a second diaphragm defining a coolant pressure chamber to which the coolant pump discharge pressure is led, said second diaphragm being associated with said thermally responsive member piston rod so as to push said piston rod in response to the coolant pump discharge pressure.

8. A coolant temperature control system as claimed in claim 7, wherein said second diaphragm is secured to said diaphragm actuator control member which is contactable with said thermally responsive member piston rod.

9. A coolant temperature control system as claimed in claim 8, wherein said thermostat includes a first spring for urging said valve member in a direction to cause said valve member to contact with said valve seat.

10. A coolant temperature control system as claimed in claim 9, wherein said diaphragm actuator includes a second spring disposed in the vacuum chamber to urge said first diaphragm in a direction that said control member moves toward said thermally responsive member piston rod.

11. A coolant temperature control system as claimed in claim 10, wherein the locational relationship between said valve member and said valve seat of said thermostat is such that the coolant pump discharge pressure acts on said valve member to urge said valve member in a direction to contact with said valve seat.

12. A coolant temperature control system as claimed in claim 5, wherein the locational relationship between said valve member and said valve seat of said thermostat is such that the coolant pump discharge pressure acts on said valve member in a direction to urge said valve member to separate from said valve seat.

13. A coolant temperature control system as claimed in claim 12, wherein said thermostat is disposed in said coolant passageway upstream of the coolant pump and downstream of the radiator.

14. A coolant temperature control system as claimed in claim 4, wherein said driving means includes a connecting member for rigidly connecting said thermostat valve seat with said diaphragm actuator control member, and a bellows connected to said valve seat and arranged to receive the coolant pump discharge pressure so that said valve seat is movable in response to the coolant pump discharge pressure.

15. A coolant temperature control system as claimed in claim 14, wherein said thermally responsive member piston rod is secured to a stationary member.

16. A coolant temperature control system as claimed in claim 14, wherein said thermostat is disposed in said coolant passageway upstream of the radiator and downstream of the coolant pump.

17. A coolant temperature control system as claimed in claim 3, wherein said driving means includes means for allowing said thermostat valve seat to be movable in the axial direction of said thermally responsive member in response to the discharge pressure of the coolant pump, and means for rigidly connecting said valve seat with said diaphragm actuator control member.

18. A coolant temperature control system as claimed in claim 17, wherein said thermostat valve member is movable in the axial direction of said thermally responsive member.

19. A coolant temperature control system as claimed in claim 18, wherein said thermally responsive member piston rod is fixed to a stationary member.

20. A coolant temperature control system as claimed in claim 1, wherein the discharge pressure of said coolant pump is higher in a high engine speed operating range than in a low engine speed operating range.

* * * * *